Patented May 10, 1949

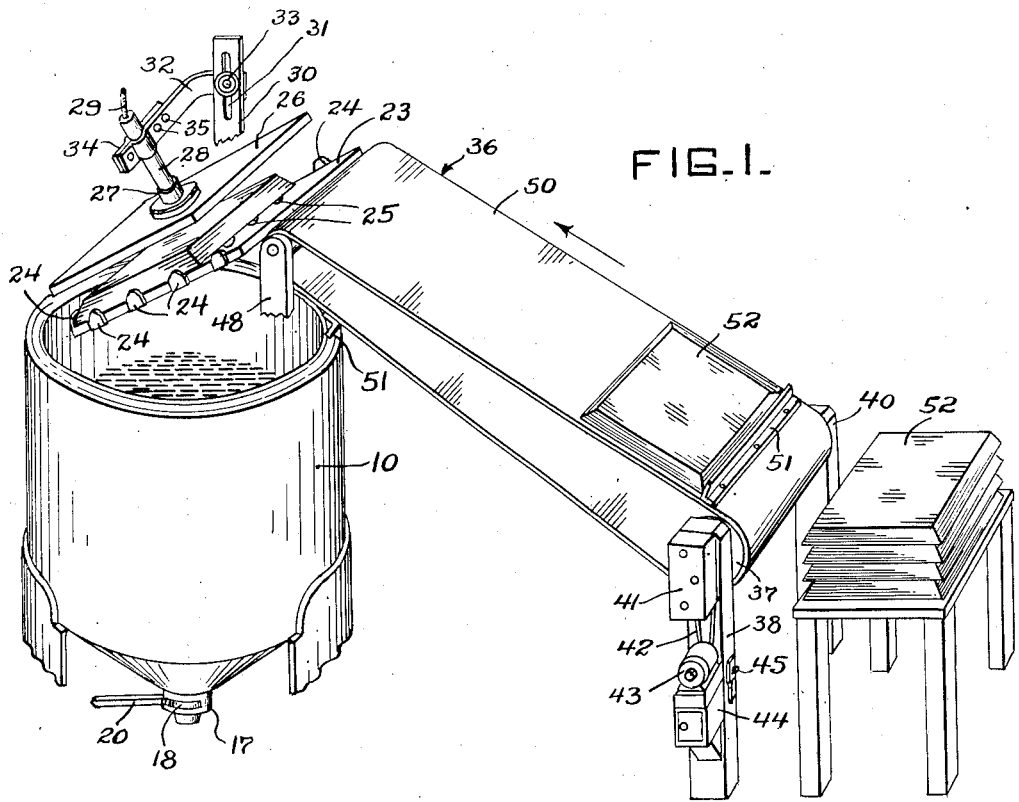
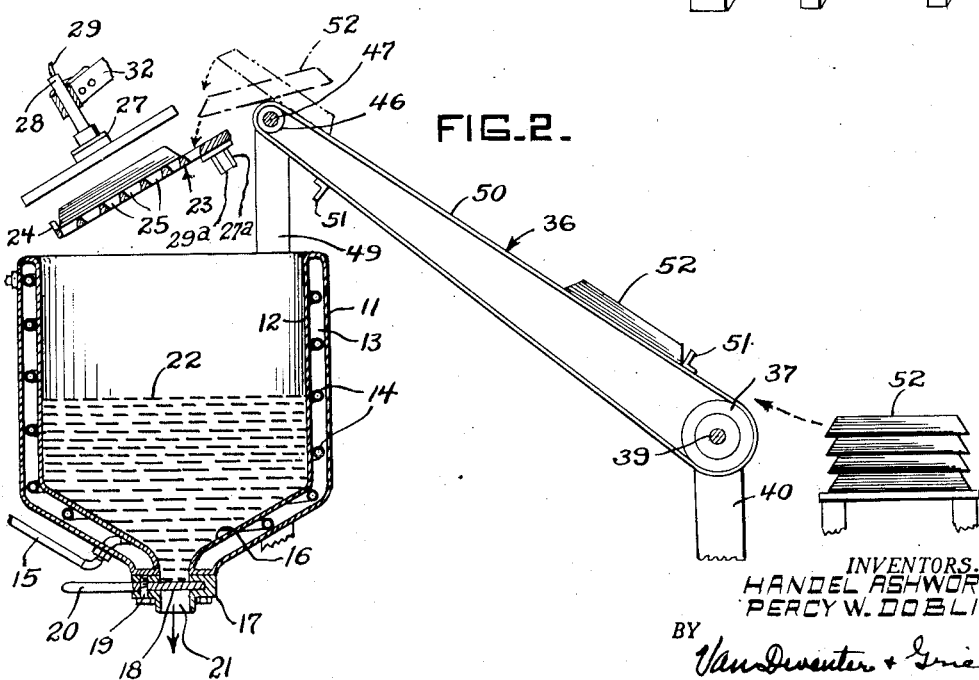

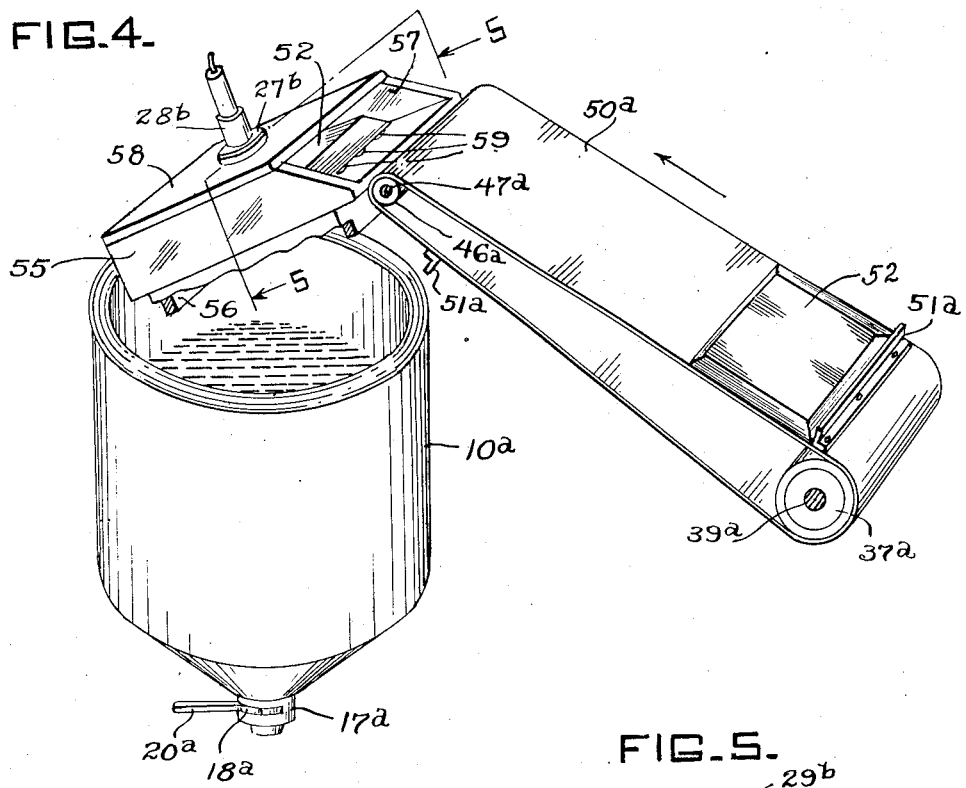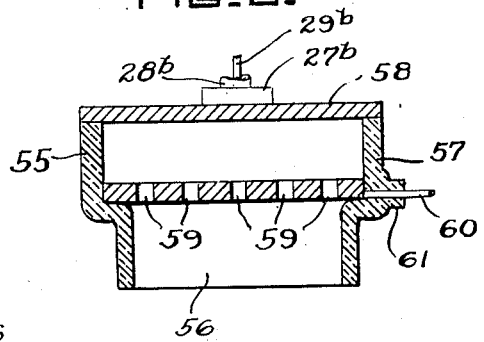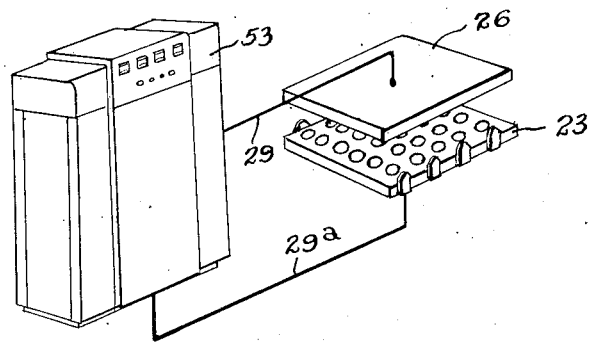

2,469,709

UNITED STATES PATENT OFFICE 2,469,709

APPARATUS FOR MELTING CHOCOLATE AND OTHER CONFECTIONS

Handel Ashworth, Baldwin, and Percy W. Doblin, Brooklyn, N. Y.

Application August 22, 1946, Serial No. 692,164

7 Claims. (Cl. 219—47)

This invention relates to an apparatus for melting chocolate and other confections, and has for an object the provision of apparatus for melting chocolate and the like rapidly.

Heretofore, in confectionery plants, the "bottle neck" has been, for example, the great length of time required to melt the slabs of chocolate so that it can be utilized for dipping or coating confections. The slabs of chocolate were placed in jacketed kettles and required an hour or more (depending on the number of slabs) to melt a batch and get it in condition for the "dippers" to use. During this time, the dippers wait around with the consequent loss in production.

According to the present invention, we propose to melt the slabs of chocolate by subjecting them to the action of radio frequencies sufficiently high to dielectrically heat and melt them, by singly conveying the slabs between electrodes connected to a suitable oscillator adapted to generate frequencies sufficiently high to cause them to melt within a comparatively few seconds of time, the spacing of the slabs on the conveyor and the rate of movement of the conveyor being such that a slab between the electrodes has time to melt and fall into a receiving vessel before the succeeding slab is delivered between the electrodes.

We have found it preferable to have the electrodes in an elevated position above the jacketed kettle, and to have the conveyor elevate the slabs and to deliver them singly between the electrodes. However, we do not wish to limit ourselves to handling the slabs singly, as they can also be handled in multiple. As the slabs enter between the electrodes and are melted, the melted or liquid chocolate falls by gravity into the jacketed kettle, and the heat normally supplied thereto (or reduced) serves to keep the chocolate in a fluid or molten state until drawn off for use.

By the same method, the reduction of other confections to a fluid or molten state may be effected.

In the accompanying drawings, which are merely given by way of example:

Fig. 1 is a perspective view, showing a conveyor for delivering slabs of chocolate between electrodes which are connected to a source of radio frequencies sufficiently high to dielectrically heat and melt said slabs, a jacketed kettle being positioned to receive the molten or fluid chocolate;

Fig. 2 is a view similar to Fig. 1, except that some of the elements are shown in section;

Fig. 3 is a diagrammatic representation of a radio frequency generator and the electrodes connected thereto;

Fig. 4 is a perspective view of a modification of the arrangement shown in Fig. 1, wherein the electrodes are supported in a transparent receptacle formed of "Pyrex" or other suitable glass; and Fig. 5 is a sectional elevation of the transparent electrode supporting member.

Referring first to Figures 1 and 2, a vessel 10 has double walls 11 and 12 with a space 13 therebetween. Within the space 13 may be positioned a coil 14 of pipe which may be connected via a pipe 15 to a source of live steam or the space 13 may be heated in any other desired manner, for example, by means of electrical heating elements. The purpose of heating the vessel is due to the fact that it receives the molten or fluid chocolate or other confection, and the purpose of the heating is to maintain it in molten or fluid state. The bottom 16 of the vessel is conical and terminates in a gate valve, generally designated by the numeral 17. The gate valve includes a shutter member 18 carried on a pivot 19 and operable by means of a handle 20, so that when the handle 20 is moved about the pivot 19, the shutter 18 is displaced, thereby opening the passage 21 and allowing the molten or fluid confection 22 in the vessel to flow out into any desired container or receptacle placed underneath the gate valve 17.

Positioned above the vessel 10 and supported by means (not shown) inclined to the horizontal is an electrode 23 which is provided with border lugs 24 along opposite sides thereof. These border lugs tend to prevent slabs of chocolate or other confections from sliding off of the electrode laterally. Along the left edge of the electrode 23, as seen in Fig. 1, are other lugs 24 which prevent the slab of chocolate or other confection from sliding off of the electrode endwise. The electrode 23 is also provided with a plurality of perforations 25 through which the fluid or molten chocolate may pass and fall into the vessel 10 therebelow. A second electrode 26, which may preferably consist of a plate, is positioned in spaced relation to the electrode 23. The electrode 26 may be provided with a boss 27 adapted to receive the lower end of a supporting rod 28. This rod may be hollow and a conductor 29 extending therethrough may connect to the electrode 26. The other end of the conductor is connected to a source of radio frequency waves.

A vertical upright 30 suitably supported near the vessel 10 has an elongated slot 31 formed therein, and a curved bracket 32 has one end clamped to the upright 30 by means of bolt means 33 extending through the slot 31. The other end of the bracket 32 has a cooperating member 34 which partially embraces the tube 28, said last end of the bracket 32 embracing the other portion of the tube so that the two together almost completely embrace the tube 28. By means of screws 35, the cooperating member may be loosened and the electrode 26 may be adjusted with respect to the electrode 23.

A conveyor, generally designated by the numeral 36, includes a pulley 37 carried on a shaft 39, journaled in suitable bearings in the uprights 38 and 40, and is connected by a reduction gearing 41 and via a belt 42 passing over pulleys (not shown) to an electric motor 43. The electric motor may be provided with a control box 44 and operated by means of a control arm 45.

Spaced apart from the pulley 37 and elevated substantially below the level thereof is a pulley 46 having a shaft 47 suitably journaled in upright supports 48 and 49. These supports are shown as broken away in Figures 1 and 2, for the sake of clarity. Spanning the pulleys 37 and 46 is an endless band or web 50 which may be provided with any desired number of lugs 51 against which slabs 52 of chocolate or other confections rest while being elevated to the electrodes in a manner to be presently described.

In the embodiment shown, the speed of the web or conveyor is such that with two lugs 51, as shown, the slab of chocolate delivered between the electrodes by one of the lugs has melted and fallen into the vessel 10 by the time the subsequent slab of chocolate is delivered between the electrodes.

Referring to Figure 2, it will be noted that as the slab of chocolate 52 is advanced upwardly on the web 50, it reaches a point above the pulley 46 where it teeters and the advancing end of the slab tips downwardly until it contacts the lower electrode 23, and since the electrode is inclined, the slab slides on the surface thereof until it contacts the lugs 24 along the lower edge of the electrode 23. It is, in this position, subjected to the full effect of the high frequency impressed on the electrodes and it melts and passes through the openings 25 and between the lugs 24 to fall into the vessel 10.

This operation is effected in a few minutes of time and consequently the chocolate dippers may withdraw the melted chocolate from the vessel through the gate valve 17 as long as there is any material therein to draw on.

In view of the fact that each slab takes only a few minutes to melt, there is always a sufficient quantity of molten chocolate within the vessel 10 for use by the operators, and therefore our new and improved apparatus eliminates the bottle neck and we have found that by this method, molten chocolate of a more uniform temperature is provided, and therefore the condition of the final product is substantially improved.

It will be noted in Figure 2 that the electrode 23 is provided with a boss 27ª which is similar to the boss 27 on the electrode 26, and a conductor 29ª is connected to the electrode 23. These conductors, as may be seen in Figure 3, are respectively connected to a generator 53, such, for example, as is now obtainable from the Radio Corporation of America.

In the modification shown in Figures 4 and 5, the conveyor and the vessel 10 are substantially identical with those described above, and therefore the same parts are given the same numeral, followed by the letter "a." The conveyor delivers the chocolate slabs 52 into the mouth 54 of a transparent vessel 55. This vessel may, for example, be formed of "Pyrex" glass. It has an open bottom 56 and within the vessel is supported an electrode 57 (which corresponds to the electrode 23 of Fig. 1) and a second electrode 58 is supported upon the body of the vessel 55 and in spaced relation to the electrode 57. The electrode 57 is provided with perforations 59 through which the melted chocolate may pass. A conductor 60, passing through a bushing 61 is electrically connected to the electrode 57. The electrode 58 may be provided with a conductor 29b which passes through a tubular support 28b and a boss 27b.

In the arrangement shown in Figs. 4 and 5, the slabs of chocolate 52 carried up by the belt 50a are, as stated above, delivered into the mouth 54 of the transparent vessel, and since the vessel is inclined much in the same manner as the electrodes in Fig. 1 are inclined, the slab passes fully into the vessel 55 and comes to rest against the lower edge thereof. The radio frequency currents generate heat within the body of the chocolate, causing it to melt rapidly, and the chocolate flows into the vessel 10a via the perforations 59 in the lower electrode and out through the open bottom 56.

In the arrangement shown in Figs. 4 and 5, the electrodes 57 and 58 may be removed and the vessel 55 and the electrodes may be cleaned and/or sterilized, as is necessary with some types of materials.

It will be understood that although we have herein shown and described our invention by way of example as used for melting slabs of chocolate, it will be understood that we may, as well, use the invention in connection with any other kinds of meltable carbohydrates than the one described above. It will further be understood that many changes may be made in the arrangements herein shown and described without departing from the spirit of the invention as defined in the following claims.

What is claimed is:

1. In apparatus for melting slabs of chocolate or the like, a vessel to receive the melted chocolate, a pair of spaced electrodes positioned above said vessel and inclined to the horizontal, means to retain each slab in position on the lower of said electrodes until it melts, means to supply radio frequency energy to said electrodes, and conveyor means for elevating said slabs and sequentially delivering them between said electrodes.

2. In apparatus for melting slabs of chocolate or the like, a jacketed vessel adapted to receive melted chocolate and maintain the same in a molten state, a pair of spaced plates supported above said vessel and inclined to the horizontal, said plates constituting electrodes and at least the lower of said plates being perforate, means adapted to be engaged by said slabs for definitely positioning the slabs on said lower electrode, conveyor means for sequentially delivering slabs of said chocolate to and between said electrodes, and means for supplying radio frequency energy to said electrodes.

3. In apparatus for melting slabs of chocolate or the like, a jacketed vessel adapted to receive melted chocolate and maintain the same in a molten state, a pair of spaced plates positioned above said vessel and inclined to the horizontal, said plates constituting electrodes, at least the lower of said electrodes being perforate and having engaging means on at least three edges thereof to define the position of a slab thereon, conveyor means for sequentially elevating slabs of chocolate to and between said electrodes, and means for supplying radio frequency energy to said electrodes.

4. In apparatus for melting slabs of chocolate or the like, a vessel to receive the melted chocolate, a second vessel positioned above said first vessel and having an opening therein through which fluids may discharge into said first vessel, an electrode positioned in said second vessel, said electrode being perforate and spanning said opening, a second electrode supported within said second vessel in spaced relation to said first mentioned electrode, means to sequentially deliver slabs of chocolate between said electrodes, and means for supplying radio frequency energy to said electrodes.

5. In apparatus for melting slabs of chocolate or the like, a vessel to receive melted chocolate, a second vessel positioned above said first vessel and having a bottom opening therein through which melted chocolate may discharge into said first vessel, said second vessel being transparent, an electrode positioned in said second vessel and spanning said opening, said electrode being perforate, a second electrode supported on said second vessel in spaced relation to the first mentioned electrode, conveyor means adapted to sequentially deliver said slabs into said second mentioned vessel and between said electrodes, and means for supplying radio frequency energy to said electrodes.

6. In apparatus for melting slabs of chocolate or the like, a vessel to receive melted chocolate, a second vessel positioned above said first vessel and having a bottom opening therein through which melted chocolate may discharge into said first vessel, said second vessel being transparent, an electrode removably supported in said second vessel and spanning said opening, said electrode being perforate, a second electrode removably supported on said second vessel in spaced relation to the first mentioned electrode, conveyor means adapted to sequentially deliver said slabs into said second mentioned vessel and between said electrodes, and means for supplying radio frequency energy to said electrodes, said means including connections direct to said second electrode, and connections passing through said vessel to said first mentioned electrode.

7. In apparatus for melting slabs of chocolate or the like, a jacketed vessel adapted to receive melted chocolate and to maintain the same in a molten state, a pair of spaced plates positioned above said vessel and inclined to the horizontal, said plates constituting electrodes, engaging means associated with said electrodes for defining the positions of said slabs thereon, inclined conveyor means for sequentially delivering slabs of chocolate to said electrodes whereby said slabs approach said electrodes along one angle to the horizontal and swing into a different angle to the horizontal as they enter between said electrodes, and means for supplying radio frequency energy to said electrodes.

HANDEL ASHWORTH.
PERCY W. DOBLIN.

REFERENCES CITED

The following references are of record in the file of this patent:

UNITED STATES PATENTS

| Number | Name | Date |
| --- | --- | --- |
| 1,900,573 | McArthur | Mar. 7, 1933 |
| 2,339,607 | Smith | Jan. 18, 1944 |
| 2,353,362 | Rudd | July 11, 1944 |
| 2,370,883 | Smith | Mar. 6, 1945 |

OTHER REFERENCES

Electronics, April 1946, page 170.